United States Patent

[11] 3,608,469

[72] Inventors Norio Mutoh;
Kenji Fuuikake, both of Nagoya, Japan
[21] Appl. No. 36,537
[22] Filed May 12, 1970
[45] Patented Sept. 28, 1971
[73] Assignee Kabushiki Kaisha Toyoto Chuo Kenkyusho
Nagoya-shi, Aichi-ken, Japan
[32] Priority May 12, 1969
[33] Japan
[31] 44042/1969

[54] APPARATUS FOR THE REMOVAL OF DEWDROPS FROM A DEWED PLATE MEMBER
2 Claims, 10 Drawing Figs.

[52] U.S. Cl. ................................................ 98/2.09
[51] Int. Cl. ........................................................ B60l
[50] Field of Search .......................................... 34/148;
98/2, 2.08, 2.09, 2.19

[56] References Cited
UNITED STATES PATENTS
2,894,443  7/1959  Rasmussen .................. 98/2.08
3,177,794  4/1965  Laing ........................... 98/2.09

*Primary Examiner*—Carroll B. Dority, Jr.
*Attorney*—Sughrue, Rothwell, Mion, Zinn & Macpeak ABSTRACT: This invention relates to improvements in and relating to an apparatus for the removal of accumulated dewdrops on a plate member, such as automotive front or windshield glass, mirror surface, gauge board or the like, by use of a hot airblast distributed over the dewed surface of the plate member. The apparatus according to this invention is characterized by the provision of a plurality of parallel rows of elongated blasting air-nozzle openings separated a lateral distance from each other, for the delivery of airblasts arranged in layers towards the glass surface.

PATENTED SEP28 1971 3,608,469

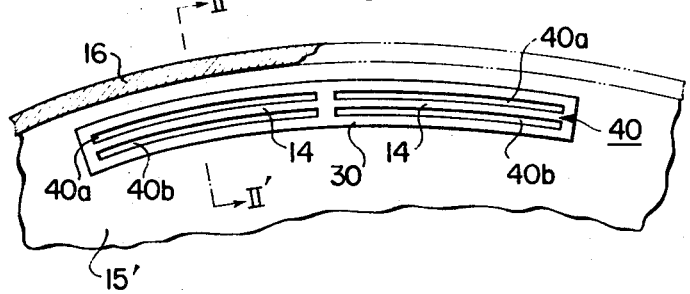
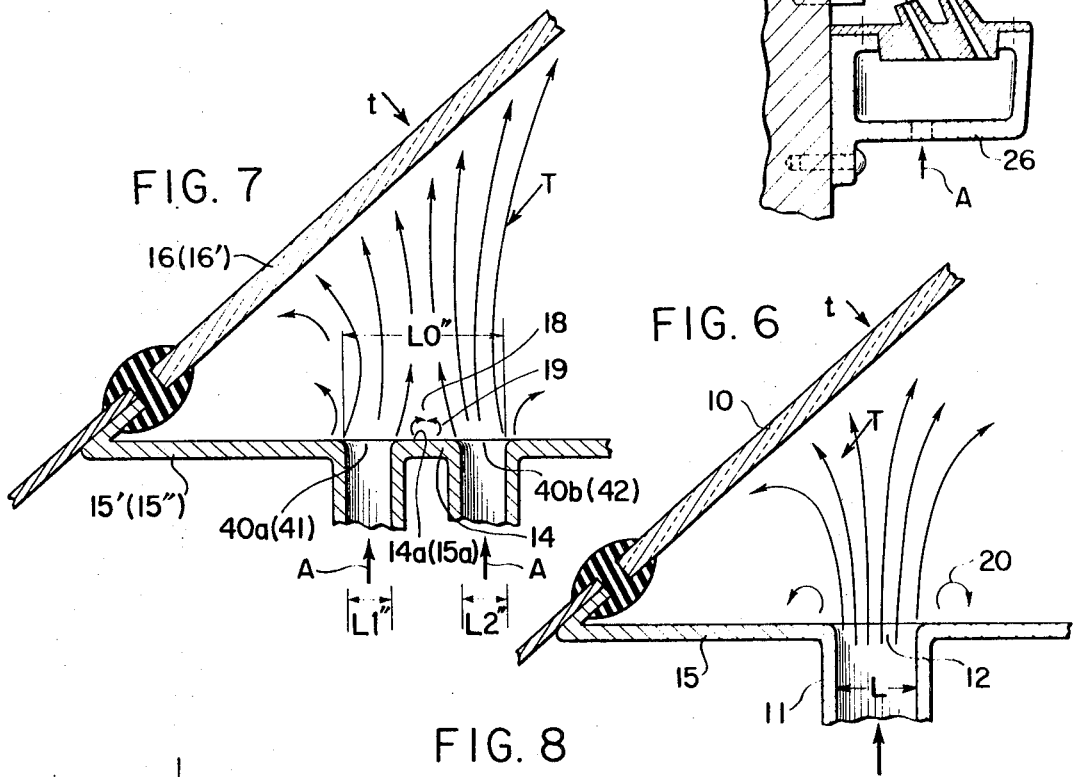
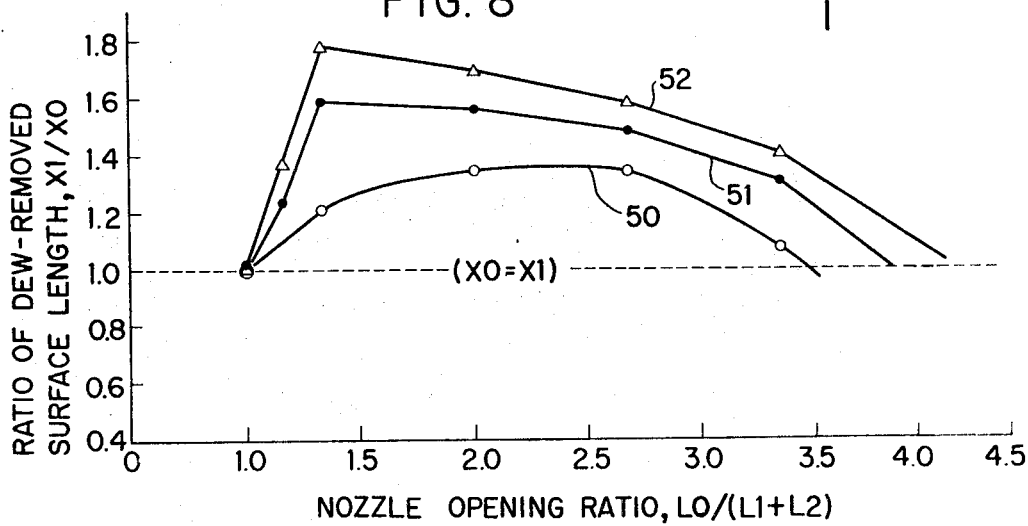

APPARATUS FOR THE REMOVAL OF DEWDROPS FROM A DEWED PLATE MEMBER

This invention relates to improvements in and relating to an apparatus for the removal of accumulated dewdrops on a plate member, such as automotive front or windshield glass, mirror surface, gauge board or the like, by use of a hot airblast distributed over the dewed surface of the plate member.

The formation of dewdrops on a glass or the like plate occasionally appearing during its use in the atmospheric air and providing an obstacle to its see-through nature in the case of an automotive windshield glass, as an example, or causing dimness of the reflecting surface of a mirror glass, for instance, takes place, as is commonly known, in such a case that the temperature of the glass surface drops below the dewpoint, on the absolute humidity of the atmosphere contacting the glass surface attains to the saturated one at the glass temperature. For the removal of the dewdrops thus formed, it has been already known to heat up the glass. As an alternative counter measure, it has also been proposed to form a dry-air layer having a lower relative humidity than the absolute one of the atmosphere, for accelerating the evaporation of the formed dewdrops; keeping the glass surface at a higher temperature than the dewpoint of the atmosphere; and/or preventing access of the wet atmosphere to the glass surface.

A commonly employed measure for attaining the above purpose in the automotive vehicle is to use an airblast which has been preheated by a certain heating means or a heat exchanger, and/or passed through a dehumidifier and is delivered through a duct from a plurality of nozzles arranged in parallel with each other, in the lateral direction of the windshield, as an example, and at an inclined angle relative thereto, for directing the delivered hop airblast against the glass surface, so as to heat up the glass surface above the dewpoint and to form an insulating airflow layer over the surface.

In order to increase the dew-removal efficiency, the following three measures are conceivable. The first one is to improve the nature of the hot blast air by elevating the temperature thereof or by lowering the humidity thereof. The second one is to increase the blasting speed in order to elevate the temperature rise of the glass surface. The third measure is to increase the mean thickness of the blasted and distributed hot air layer, as measured perpendicularly to the glass surface. When the first measure should be employed, the heating means and the dehumidifier must be intensified in their capacity, which will cause, however, a substantial increase of the investment in this respect. For the realization of the second measure, the blasting air quantity per unit of time must be increased and the capacity of the blower and the driving power source should naturally be intensified. In addition, the capacity of the heat exhanger or that of the air-heating means must be increased to an unacceptable degree. If the third measure is employed, the nozzle opening must be correspondingly enlarged and foreign bodies may be dropped into the opening, which would result in a dangerous accident. In addition, a substantial enlargement of the nozzle opening will reduce the blasting air speed. In compensation thereof, the capacity of the blasting blower must be increased again to an unacceptable degree.

The primary object of the invention is to provide an apparatus for the removal of dewdrops from a dewed surface with a smallest possible quantity of blast air directed over a broadest possible area of the surface, while obviating the aforementioned conventional drawbacks.

In order to realize the above object, the mechanism according to this invention comprises a plurality of parallel rows of air-blasting nozzles disposed parallelly to each other in the longitudinal direction of said nozzle opening on an imaginary plane connecting the outlets of the nozzles, so as to direct the blasting airflows delivered therefrom against the dewed surface substantially in the form of multilayers.

In this way, dewdrops may be removed from the dewed surface in a highly efficient way. It should be mentioned that the apparatus according to this invention is especially suitable for the removal of dimming dewdrops from the automotive windshield glass.

These and further objects, features and advantages of the invention will become more apparent from the following detailed description of several preferred embodiments of the invention which are shown in the highly simplified schematic way and in comparison with a comparative conventional apparatus. In the drawings:

FIG. 4 is a top plan view of FIG. 2, wherein, however, a glass plate to be protected is shown as partially sectioned and partially simplified.

FIG. 6 is an explanatory sectional view for the explanation of the mode of the mode of the blast airflow attainable when following the conventional teachings.

FIG. 7 is a similar view to FIG. 6, illustrating, however, the teachings of the present invention.

FIG. 8 is an explanatory chart showing the dew-removal effect of the invention, as ascertained by our practical experiments.

FIG. 10 is a similar view to FIG. 9, yet showing a fourth embodiment of the invention.

Referring now to the accompanying drawings, the invention will be described in detail and in a comparative way with a conventional comparative apparatus.

Figure 1:
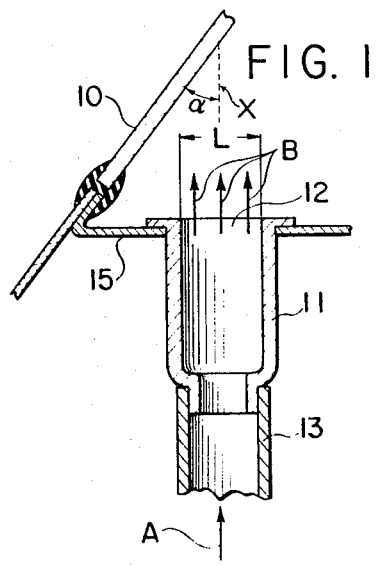
FIG. 1 is an elevational and sectional view of essential parts of a comparative conventional apparatus shown for the purpose of comparison.

In FIG. 1, a representative conventional apparatus shown, wherein the numeral 10 represents an automotive windshield glass shown in section and only partially simplification. Although only one nozzle is shown at 11 in the drawing only for simplicity, there is provided a row of similar nozzles arranged in an imaginary plane, substantially perpendicular to the drawing paper. Each of these nozzles 11 is flanged at its top end and fixedly mounted on a conventional dash panel 15 of an automotive vehicle, not shown. The nozzle 11 rigidly and tightly fitted at its reduced lower end in the top end of a duct 13. These ducts 13, although shown only one for simplicity, are fed each with a properly heated and dehumidified air stream by passing it through a heat exhanger or a heater, not shown, preferably from a common distributor, not shown. This stream is shown in a schematic way by an arrow A in FIG. 1.

The axis X of the nozzle 11 or a common plane including all of these axes forms and acute included angle $\alpha$, as shown, with the inclinedly mounted shield 10 so that all the airblasts, shown by several small arrow B for the representative nozzle 11 and delivered from the outlet top-end openings 12, are brought at first into collision against the back surface of the glass and then distributed in the form of a flowing air layer over the substantial area of the glass back surface which directs towards right in FIG. 1 or towards the driver's seat, although not shown. By this hot air blasting, the glass back surface is heated up above the dewpoint of the atmosphere prevailing within the vehicle cabin, not shown, and a flowing dry air layer is formed over the glass surface for preventing access of the cabin atmosphere to the glass 10.

Figure 2:
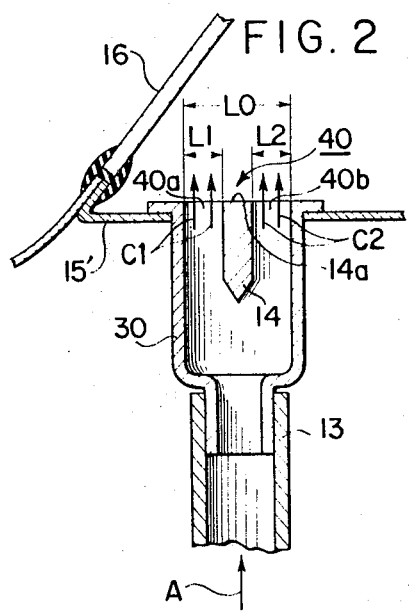
FIG. 2 is a similar view to FIG. 1, showing a first embodiment of the invention.

In FIG. 2, first embodiment is shown. In this embodiment, the numerals 13, 15' and 16 and the symbol A denote similar members and the blast airflow shown in the foregoing at 13, 15 and 10, and at A respectively.

The nozzle representatively shown at 30 is so modified from the conventional one shown in FIG. 1 that its upper opening 40 is divided into two parallel outlet passages 40a and 40b by the provision of a separator wall 14 extending between the both ends of the nozzle-defining wall, thus substantially in the direction perpendicular to the plane of the drawing paper. This divided structure is clearly seen from FIG. 4. In this way, two rows of nozzle outlet openings 40a and 40b are formed when seen the whole arrangement of the nozzles 30. In FIG. 4, however, only two of a number of nozzles 30 arranged, as may well be supposed, along an imaginary curve which is parallel to the elongated and curved windshield glass 16. As is shown, the nozzle division into two separated outlet openings 40a and 40b is made in the lateral direction perpendicular to the windshield 16.

Although the overall nozzle width LO measured at the top outlet end opening is selected to be longer than the effective width L of the foregoing nozzle 11 as measured at the top outlet opening 12 thereof, but the sum of the outlet widths L1 and L2 of the divided two nozzle outlets 40a and 40b is selected to be equal to said L. Therefore, the effective discharge area of these outlet openings 40a and 40b in this first embodiment is equal to that of the conventional nozzle arrangement shown in FIG. 1, because of the elongated rectangular configuration of each of the airblast openings. The corresponding flows of the airblasts are shown by two groups of small arrows C1 and C2.

Figure 3:
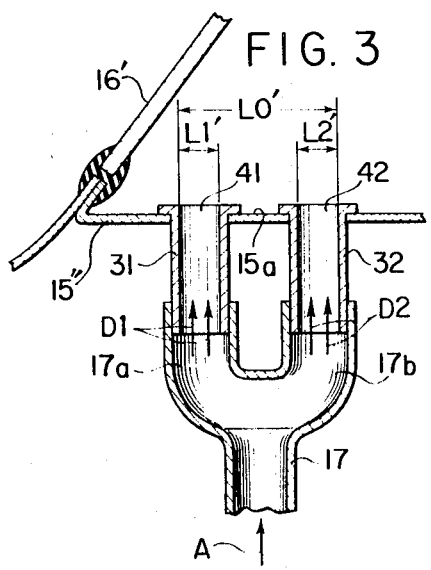
FIG. 3 is a similar view to FIG. 2, showing a second embodiment of the invention.
Figure 5:
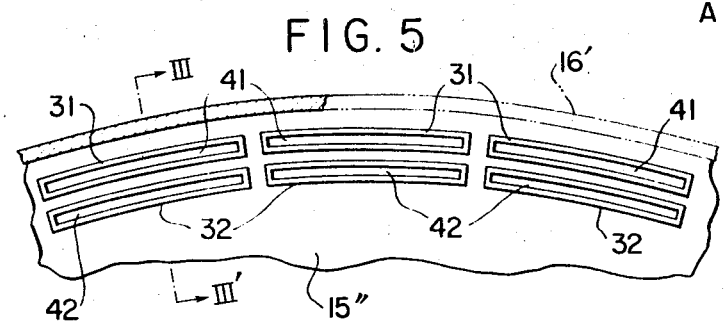
FIG. 5 is similar view to FIG. 4, showing a top plan view of FIG. 3.

In the second embodiment shown in FIGS. 3 and 5, two separated nozzle elements 31 and 32 are provided which are arranged in parallel to each other, as seen from FIG. 5. The common axis to these nozzle elements extends again in parallel to the windshield glass 16' the respective outlet openings of these nozzle elements 31 and 32 attached again fixedly to the dash panel 15" are shown at 41 and 42, respectively. At the lower ends of these nozzle elements 31 and 32 are slid tightly into the upper ends of two branches 17a and 17b of a dry-air-supply duct 17. The blasting air flows flowing through the respective nozzle passages are shown at D1 and D2, respectively. The arrow A represents the same meaning as before.

The sum of the respective widths L1' and L2' of the outlet openings 41 and 42 is selected again to be equal to the said width L. Although only three sets of the nozzle assemblies are shown in FIG. 5, the number thereof may be increased, as the occasion may desire.

Now return to FIG. 4, the two airblast openings 40a of the two nozzle assemblies are arranged in a curved row which is parallel to the windshield glass 16.

The remaining two outlet openings 40b are equally arranged in a curved row. As seen, these curved rows are parallel to each other. It will be easily seen that these two-row arrangement of the nozzle-discharge openings extends along substantially the whole length of the glass 16 which is shown partially section and partially in a highly simplified way by chain-dotted lines. Therefore, the number of the nozzle assemblies may be increased, as the occasion may desire.

In FIG. 5, the discharge-outlet openings 41 of the three successive nozzle elements 31 are arranged in a curved row, and similarly the remaining three openings 42 are positioned again in a curved row. As seen, these rows are parallel to each other and to the curved elongation of the windshield 16' which is shown again partially in section and partially in a schematic way.

In the embodiments shown in FIGS. 2–5, air is heated upon a suitable temperature which is higher than the dewpoint of the atmosphere contacting the windshield by passing preparatorily through a heat exhanger or an electric heater, not shown, and further through a dehumidifier, again not shown, thence introduced, as schematically shown by respective arrows A through the ducts 13; 17 into the blast-nozzle passages 40a, 40b; 41, 42, respectively.

From the respective blast openings, airstreams are blasted against the windshield glass 16; 16'. In this case, it should be noted that between the pair of blast openings 40a and 40b or 41 and 42, there is a certain idle zone shown at 14a (FIG. 2) or 15a (FIG. 3), respectively, so that the combined airblast stream as observed at a direct downstream position from said opening will substantially attain the overall lateral width LO or LO' fully covering the two rows of said blast openings. As practically observed, although the blast airstreams are not of the rectified nature, these are influenced by the very presence of a low dynamic pressure zone 18 (FIG. 7) positioned above the idle area 14a or 15a, and the initially separated blast streams are subjected to a sectional contraction effect. Therefore, the combined blast stream has a shorter width than the combined lateral length LO" shown in FIG. 7 which length corresponds to that shown at LO (FIG. 2) or LO' (FIG. 3). Thanks to this phenomenon, the combined and contracted blast airstream has a substantially strong penetration performance in comparison with an imaginary airblast which is assumed to be delivered from a single imaginary nozzle having a lateral width of blast opening corresponding to a sum of L1" plus L2" which is equal to L (FIG. 1) set forth hereinbefore.

FIG. 6 illustrates the dynamic effect of a conventional single-nozzle airblast. The blast stream delivered from the discharge opening 12 of the nozzle 11 represents a considerable amount of branched-off swirls directly upon delivery from the discharge opening and in the outside peripheral zone of the main body of the blast stream, as shown at 20 in FIG. 6 as an example. This phenomenon means kind of disadvantageous divergence effect which affects adversely upon the desirous penetration power of the blast stream in advance of its arrival at the dewed surface of the windshield glass 10.

In the improved apparatus according to this invention, shown in FIG. 7, however, attracting swirls 19 are generated in the dynamically low pressure zone 18, thereby the both blast streams delivered from the separated delivery openings 40a (or 41) and 40b (or 42) are brought together and subjected to a cross-sectional contraction to a substantial degree, as was referred to above. Therefore, the overall width of the combined blast stream has a smaller lateral dimension than LO" (FIG. 7), thus providing once a powerful penetrating power and, after then only, the blast being subjected to a gradual divergence. In this way, the dewdrops removal effect will be considerably intensified according to the novel teachings of the present invention.

The chart shown in FIG. 8 clearly demonstrates the aforementioned inventive effect as ascertained by our practical and comparative experiments from which the comparative dew-removal effect expressed in terms of the ratio of dew-removed surface lengths was plotted against the nozzle-opening ratio expressed by LO/CL1+L2).

For carrying out the experiments, a conventional apparatus as shown in FIG. 6 was used for comparison. In this case, the outer surface of the windshield glass 10 was kept at a low temperature, generally expressed by $t$ which is lower than the dewpoint of the cabin atmosphere so as to form dewdrops on the back surface of the glass. Then, a continuous airblast temperature generally expressed by T which is higher than said low temperature $t$ was delivered from the nozzle opening 12 against the dewed back surface of the same glass 10. Then, the cleared-away area of dew was measured in its lateral length of the glass which is expressed by XO herein.

Next, the experimental data such as the low glass surface temperature $t$, the air-blasting temperature T; and the blast-air-delivery rate were unchanged and the sole nozzle opening was divided into two, the nearest one to the glass being fixedly positioned, and then the remaining or far-positioned nozzle opening was arranged movable, so as to make several experiments with different mutual distances between the both nozzles divided. The widths of the divided nozzles were set to L1" and L2", as before, and the relation: L1"+L2"=L was preserved, as in the case of the apparatus shown in FIG. 7. In this way, the dew-removal effect expressed in terms of X1/X0 was plotted against the nozzle opening ratio: LO/L1+L2), as shown.

The curve 50 shown in the chart, FIG. 8, was obtained with L1" and L2" being 3 mm., respectively; with the airblast rate being 0.036 m.³/sec. per unit cross-sectional area of the blast opening. The results were compared with the same blasting ratio with a single nozzle having a lateral width L of 6mm.

The next upper curve 51 represents the results of several experiments with two separated, yet parallel-arranged nozzle openings having L1" and L2" of equal 6 mm., respectively. The airblast rate was set to 0.036 m.³/sec. per unit area of nozzle opening. The results were compared with those of similar experiments carried out on a unified nozzle having a lateral opening length of 12 mm.

The uppermost curve 52 represents the results of several experiments with two separated, yet parallel-arranged nozzle opening having L1" and L2" of equally 6 mm., respectively. The airblast ratio was set to 0.024 m.³/sec. per unit opening area of nozzle. Comparative unified nozzle had a lateral width of 12 mm.

From the chart shown in FIG. 8, it will be clearly observed that with L1+L2+L; and with a certain constant airblast rate, the apparatus according to this invention will provide the ratio: L0/(L1+L2) being larger than unity, or more specifically, a division of a nozzle opening into two elemental ones separated through a separating distance from each other will provide the ratio: X1/X0 being larger than unity which means that the lateral length of the dew-removal area is increased substantially in comparison with the similar length obtainable with a single unified nozzle.

The lateral length of dew removal representing the dew-clearing-away performance of the apparatus according to the invention will become, as seen from the chart of FIG. 8, substantially to that of the unified sole nozzle opening, when the ratio: L0/(L1+L2) exceeds 1.3. It will be further seen that the dew-clearing-away performance of the apparatus is 20–80 percent larger than that of the prior art sole-nozzle-row-type machine, within such range, indeed, as extending between 1.3 and 3.0 of the ratio: L0/(L1+L2). In this chart, the critical point wherein the ratio: X1/X0 becomes unity will be at 3.4; 3.9 or 4.3, respectively, of the ratio: C0/(L1+L2) for the curve 50; 51 or 52.

Figure 9:
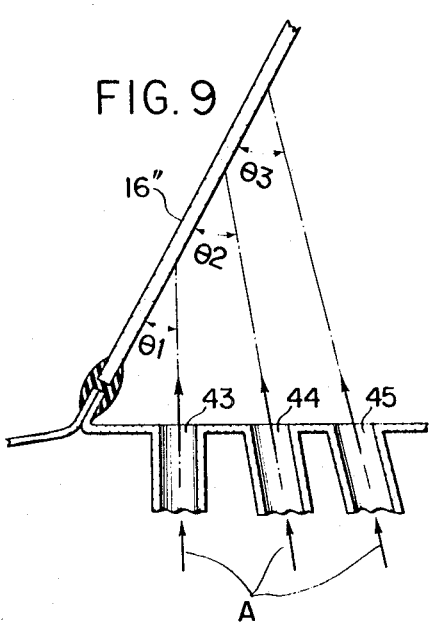
FIG. 9 is a schematic and partial section of a third embodiment of the invention.

In the embodiments mentioned herein in the foregoing, the nozzle-outlet openings are arranged in two parallel rows. As seen in FIG. 9, however, the number of rows of nozzle-opening groups may be increased to three. The thus dividedly distributed airblast openings are shown at 43, 44 and 45. It may naturally be conceivable to further increase the number of the rows to a still more numerous one. The respective angle of inclination of the mean blast airflows delivered from the openings 43–45 or a kind of angle of attack is shown at $\theta 1$, $\theta 2$ and $\theta 3$, respectively. A preferred arrangement of these inclination angles $\theta 1$–$\theta 3$ is such as shown that with the longer distance from the windshield 16" to the respective openings 43–45, they become smaller than each of the preceding one. These angles may be varied in consideration of the covering area of the windshield glass and the inclination of the latter relative to the horizontal.

The invention is not limitative to its application for dew-removal service for the automotive windshield glass.

The dew-removal service by use of the inventive apparatus may be carried out on a mirror 25 fitted on the wall of a bathroom, washroom or the like in which a humidity-rich atmosphere prevails. In this case, dewdrops can be effectively removed by blasting dried and heated airstreams from two rows of nozzle openings representatively shown only two nozzles at 46 and 47 against the surface of mirror 25 through a common distributor box 26 fluidically connected through a heater and a dehumidifier, not shown, with a proper outside supply source, according to the novel teachings of the invention set forth hereinbefore.

As a further example, a show-window glass, gauge board or the like plate member may equally be removed of formed dewdrops as the condensate from aqueous humidity contained in a gaseous atmosphere such as nitrogen, argon or the like, kept in contact with the plate.

Therefore, the term "air" used in the foregoing description can be read as "gaseous atmosphere" when applicable without prejudice.

It will thus be seen that by use of the inventive dew-clearing mechanism comprising a plurality of parallel rows of gas-blasting nozzles disposed parallelly to each other in the longitudinal direction of the nozzle opening on an imaginary plane connecting the outlets of the nozzles, so as to direct the blasting airflows delivered therefrom against the dewed surface substantially in the form of multilayers, the dewdrops condensed from the ambient atmosphere rich of aqueous humidity on the surface can effectively be cleared off.

According to our experiment, the dew-removal effect thus obtained is higher 20–100 percent that the case of single-row arrangement of blasting nozzles. This efficiency elevation was observed in terms of the dew-removed surface areas in comparison with the use of a conventional comparative apparatus shown and described hereinbefore by reference to FIG. 1. Naturally, the apparatus of the invention is utilized for warming up the glass or the like plate member always above the dewpoint of the ambient atmosphere, so as to avoid from the beginning the formation of dewdrops. The thus-formed practically multilayer air or gas shield acts naturally as an insulating means for the prevention of access of the dew-forming gaseous atmosphere from contact with with the plate member. Therefore, the apparatus for dew removal from a plate member constructed according to this invention is highly effective for cooperation with the automotive windshield glass and in the above-mentioned service.

The embodiments of the invention in which an exclusive property or privilege is claimed are as follows:

1. An apparatus for the removal and prevention of dewdrops on a glass or the like plate member by blasting hot-air jetstreams against the dewed and dewing surface of the plate member from a nozzle positioned along one side thereof said apparatus comprising: a plate member, a plurality of parallel rows of elongated air nozzles laterally spaced from each other, each of said rows of said nozzles extending in a direction outwardly from said one side of said plate member and oriented to deliver air in layers towards the surface of said plate member.

2. An apparatus for the removal of formed dewdrops and for the prevention of dew formation on a plate member, preferably made of glass or the like materials, comprising: a plate member, a plurality of parallel rows of elongated nozzle openings each of, laterally spaced from each other said rows being parallel to said plate member and laterally spaced outwardly therefrom, and a separating means provided between each two rows of said nozzle rows.

UNITED STATES PATENT OFFICE
CERTIFICATE OF CORRECTION

Patent No. 3,608,469                    Dated   January 18, 1972

Inventor(s)  Norio Mutoh et al

It is certified that error appears in the above-identified patent and that said Letters Patent are hereby corrected as shown below:

Delete: Inventors-Norio Mutoh;
          Kenji Fuuikake and substitute therefor--
   Inventors-Norio Mutoh;
          Kenji Fujikake Delete: Assignee: Kabushiki Kaisha Toyoto Chuo Kenkyusho and substitute therefor--Kabushiki Kaisha Toyota Chuo Kenkyusho--;

Signed and sealed this 4th day of April 1972.

(SEAL)
Attest:

EDWARD M. FLETCHER, JR.
Attesting Officer

ROBERT GOTTSCHALK
Commissioner of Patents